US010007926B2

(12) United States Patent
Hughes et al.

(10) Patent No.: US 10,007,926 B2
(45) Date of Patent: *Jun. 26, 2018

(54) SYSTEMS AND METHODS FOR PREDICTING AND PRICING OF GROSS RATING POINT SCORES BY MODELING VIEWER DATA

(71) Applicant: Adobe Systems Incorporated, San Jose, CA (US)

(72) Inventors: John Hughes, Lafayette, CA (US); Adam Rose, San Pablo, CA (US); John M. Trenkle, Albany, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 14/144,016

(22) Filed: Dec. 30, 2013

(65) Prior Publication Data

US 2014/0278938 A1 Sep. 18, 2014

Related U.S. Application Data

(60) Provisional application No. 61/779,231, filed on Mar. 13, 2013.

(51) Int. Cl.
*G06Q 30/00* (2012.01)
*G06Q 30/02* (2012.01)
(52) U.S. Cl.
CPC ..... *G06Q 30/0246* (2013.01); *G06Q 30/0273* (2013.01)
(58) Field of Classification Search
CPC .................. G06Q 30/0246; G06Q 30/0273
(Continued)

(56) References Cited

U.S. PATENT DOCUMENTS

| 5,937,392 A | 8/1999 | Alberts |
| 6,560,578 B2 | 5/2003 | Eldering |

(Continued)

FOREIGN PATENT DOCUMENTS

| WO | WO-2011/056346 | 5/2011 |
| WO | WO-2015/034838 | 3/2015 |

OTHER PUBLICATIONS

Microsoft Computer Dictionary, Fifth Edition, 2002, Microsoft Press, p. 23.*

(Continued)

*Primary Examiner* — David J Stoltenberg
*Assistant Examiner* — Michael I Ezewoko
(74) *Attorney, Agent, or Firm* — Keller Jolley Preece

(57) ABSTRACT

Systems and methods are disclosed for characterizing websites and viewers, for predicting GRPs (Gross Rating Points) for online advertising media campaigns, and for pricing media campaigns according to GRPs delivered as opposed to impressions delivered. To predict GRPs for a campaign, systems and methods are disclosed for first characterizing polarized websites and then characterizing polarized viewers. To accomplish this, a truth set of viewers with known characteristics is first established and then compared with historic and current media viewing activity to determine a degree of polarity for different Media Properties (MPs)—typically websites offering ads—with respect to gender and age bias. A broader base of polarized viewers is then characterized for age and gender bias, and their propensity to visit a polarized MP is rated. Based on observed and calculated parameters, a GRP total is then predicted and priced to a client/advertiser for an online ad campaign.

22 Claims, 7 Drawing Sheets

(58) Field of Classification Search
USPC .................................................. 705/14.45
See application file for complete search history.

(56) References Cited

U.S. PATENT DOCUMENTS

| | | | |
|---|---|---|---|
| 7,181,412 | B1 | 2/2007 | Fulgoni et al. |
| 7,260,837 | B2 | 8/2007 | Abraham et al. |
| 7,493,655 | B2 | 2/2009 | Brown |
| 7,835,937 | B1 | 11/2010 | Karlsson et al. |
| 7,835,938 | B1 | 11/2010 | Karlsson |
| 7,930,285 | B2 | 4/2011 | Abraham et al. |
| 8,069,076 | B2 | 11/2011 | Oddo |
| 8,073,807 | B1 | 12/2011 | Srinivasaiah |
| 8,145,645 | B2 | 3/2012 | Delli Santi et al. |
| 8,175,914 | B1 | 5/2012 | Benson et al. |
| 8,182,346 | B2 | 5/2012 | Herrmann et al. |
| 8,190,475 | B1 | 5/2012 | Merrill |
| 8,341,047 | B1 | 12/2012 | Furney et al. |
| 8,380,562 | B2* | 2/2013 | Toebes .............. G06Q 30/02 705/14.49 |
| 8,412,648 | B2* | 4/2013 | Karypis .............. G06Q 10/04 706/12 |
| 8,554,602 | B1* | 10/2013 | Zohar .............. G06Q 30/0251 705/7.33 |
| 8,571,930 | B1 | 10/2013 | Galperin |
| 8,650,084 | B2 | 2/2014 | Athey et al. |
| 8,700,543 | B2 | 4/2014 | Glickman |
| 8,719,082 | B1* | 5/2014 | Snyder .............. G06Q 90/00 705/14.1 |
| 8,924,993 | B1 | 12/2014 | Niebles Duque et al. |
| 9,087,332 | B2* | 7/2015 | Bagherjeiran ......... G06Q 30/00 |
| 9,727,878 | B2* | 8/2017 | Curd .............. G06Q 30/02 |
| 2003/0074252 | A1* | 4/2003 | Chandler-Pepelnjak G06Q 30/02 705/14.53 |
| 2003/0105677 | A1 | 6/2003 | Skinner |
| 2004/0019518 | A1 | 1/2004 | Abraham et al. |
| 2005/0021395 | A1* | 1/2005 | Luu .............. G06Q 30/02 705/14.41 |
| 2006/0015294 | A1 | 1/2006 | Yetter, Jr. et al. |
| 2006/0018516 | A1 | 1/2006 | Masoud et al. |
| 2006/0074749 | A1 | 4/2006 | Kline et al. |
| 2006/0212350 | A1 | 9/2006 | Ellis et al. |
| 2007/0027760 | A1 | 2/2007 | Collins |
| 2007/0067215 | A1 | 3/2007 | Agarwal et al. |
| 2007/0094042 | A1 | 4/2007 | Ramer et al. |
| 2007/0180469 | A1 | 8/2007 | Finley et al. |
| 2007/0208728 | A1 | 9/2007 | Zhang et al. |
| 2009/0006145 | A1 | 1/2009 | Duggal |
| 2009/0024546 | A1 | 1/2009 | Ficcaglia et al. |
| 2009/0119172 | A1 | 5/2009 | Soloff |
| 2009/0216619 | A1 | 8/2009 | Tavernier |
| 2009/0254420 | A1* | 10/2009 | Curd .............. G06Q 30/02 705/7.29 |
| 2010/0138290 | A1* | 6/2010 | Zschocke ........... G06Q 30/0242 705/14.41 |
| 2010/0262464 | A1 | 10/2010 | Monteforte et al. |
| 2011/0035276 | A1 | 2/2011 | Ghosh et al. |
| 2011/0106633 | A1 | 5/2011 | Cook |
| 2011/0137721 | A1 | 6/2011 | Bansal |
| 2011/0145070 | A1 | 6/2011 | Wolinsky et al. |
| 2011/0246310 | A1 | 10/2011 | Buchalter et al. |
| 2012/0004983 | A1 | 1/2012 | Borthwick et al. |
| 2012/0041816 | A1 | 2/2012 | Buchalter |
| 2012/0054021 | A1 | 3/2012 | Kitts et al. |
| 2012/0158456 | A1 | 6/2012 | Wang et al. |
| 2012/0158954 | A1 | 6/2012 | Heffernan et al. |
| 2012/0197816 | A1 | 8/2012 | Short et al. |
| 2012/0239809 | A1 | 9/2012 | Mazumdar et al. |
| 2012/0316957 | A1 | 12/2012 | Zhou et al. |
| 2013/0103681 | A1 | 4/2013 | Renders et al. |
| 2013/0124308 | A1 | 5/2013 | Hegeman et al. |
| 2014/0236710 | A1 | 8/2014 | Nashed |
| 2014/0278749 | A1 | 9/2014 | Trenkle et al. |
| 2014/0278912 | A1 | 9/2014 | Hughes et al. |
| 2014/0278937 | A1 | 9/2014 | Hughes et al. |
| 2014/0289017 | A1 | 9/2014 | Trenkle et al. |
| 2014/0337143 | A1 | 11/2014 | Petersen et al. |
| 2015/0066639 | A1 | 3/2015 | Knapp et al. |
| 2015/0066662 | A1 | 3/2015 | Knapp et al. |
| 2016/0063573 | A1 | 3/2016 | Thakkar et al. |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Nielsen Holdings N.V., "AOL Leverages Nielsen Online Campaign Ratings Measurement to Offer TV-Like GRP Guarantee for Online Video", www.nielsen.com/us/en/insights/press-room/2012/aol-leverages-nielsen-online-campaign-ratings-measurement-to-off.html, (Apr. 16, 2012), 3 pp. total.
Nielsen Holdings N.V., "Nielsen Campaign Ratings Overview", www.nielsen.com/us/en/practices/marketing-effectiveness/nielsen-campaign-ratings/overview.html, (2013), 4 pp. total.
YuMe, "Calculating Online Video GRP for Television Buyers", downloaded from www.YuMe.com, (at least as early as 2010), pp. 1-5.
U.S. Appl. No. 13/927,687, Jul. 13, 2017, Office Action.
U.S. Appl. No. 14/167,183, Jun. 29, 2017, Office Action.
Robotics, Science and Systems III, Wolfram Burgard, Oliver Brock, and Cyril! Stachniss, The MIT Press, 2008, pp. 41-48.
Language and Mind, Chomsky, Oxford University Press, 2005, p. 62.
Computing the Mind, Shimon Edelman, Oxford University Press, 2008, pp. 26-31.
Noetics, Lawrence Krader, 2010, Peter Lang Publishing, pp. 551-553.
Britannica Concise Encyclopedia, Encyclopedia Britannica, 2006, p. 537.
"Advances in Expert Systems", Published by InTech; Edited by Petrcia Vizureanu, (Dec. 5, 2012), pp. 101-103.
U.S. Appl. No. 13/927,687, Apr. 6, 2015, Office Action.
U.S. Appl. No. 13/927,687, Oct. 30, 2015, Office Action.
U.S. Appl. No. 13/927,687, Oct. 21, 2016, Office Action.
U.S. Appl. No. 14/143,984, Dec. 11, 2015, Office Action.
U.S. Appl. No. 14/143,984, Jul. 27, 2016, Office Action.
U.S. Appl. No. 14/167,183, Dec. 22, 2016, Office Action.
U.S. Appl. No. 14/143,984, Nov. 29, 2017, Office Action.
U.S. Appl. No. 14/143,984, dated Apr. 23, 2018, Notice of Allowance.
U.S. Appl. No. 14/565,197, dated Apr. 10, 2018, Office Action.

* cited by examiner

SYSTEMS AND METHODS FOR PREDICTING AND PRICING OF GROSS RATING POINT SCORES BY MODELING VIEWER DATA

CROSS-REFERENCE TO RELATED APPLICATIONS

This application claims the benefit of U.S. Provisional Patent Application No. 61/779,231 filed Mar. 13, 2013.

BACKGROUND OF THE INVENTION

1. Field of the Invention

The present invention relates generally to systems and methods for rating the success of online advertising campaigns as well as predicting the success of online advertising campaigns and pricing campaigns based on the predictions. It also relates to systems and methods for characterizing viewer behavior and determining to what degree a specific viewer's behavior places them in a specific category with respect to their behavior, thus becoming a polarized viewer. The invention also relates to systems and methods for characterizing websites with respect to polarized characteristics.

2. Prior Art

According to www.wikipedia.org®, Gross Rating Point (GRP) is a term used in advertising to measure the size of an audience reached by a specific media vehicle or schedule. It is the product of the percentage of the target audience reached by an advertisement, times the frequency they see it in a given campaign (frequency×% reached). For example, a television advertisement that is aired 5 times reaching 50% of the target audience each time it is aired would have a GRP of 250 (5×50%). To achieve a common denominator and compare media, reach×frequency are expressed over time (divided by time) to determine the 'weight' of a media campaign. GRPs are used predominantly as a measure of media with high potential exposures or impressions, like outdoor, broadcast, or online (Internet).

GRP values are commonly used by media buyers to compare the advertising strength of various media vehicles, including in recent years, online advertising on the Internet. All GRP calculations to date are historical, being compiled after a campaign completes. Video ads typically contain a pixel pattern called a "tracking pixel" supported by, for instance, Nielsen®. For example, if a user logs onto Facebook® (a Nielsen media partner) and then visits another website where an ad that Nielsen is tracking is shown, Nielsen will put a pixel in the ad that will prompt Facebook to send Nielsen the age and gender of the people who viewed the ad. Nielsen can then match the IP address of the pixel to see if the person is also on a Nielsen panel. If so, the information from the third-party partner can be combined with the panel demographics. This mechanism enables Nielsen to report on the GRPs delivered on a specific online ad campaign after the campaign has completed.

In the RTB (Real-Time Bidding) environment for electronic media impression auctions, an electronic advertising agency/consolidator operating a demand-side platform receives billions of daily auction opportunities for electronic media impressions from partners like Google®, Yahoo®, etc. These partners operate auctions for ad impressions and then place electronic ads based on auction results. A partner's auction is considered an external auction with respect to a demand-side platform where an internal auction may also be operated to determine which advertisements, also referred to herein as ads, and bids are submitted to the external auction. Each ad impression opportunity includes information parameters about the ad impression—for example, the target website, geolocation of the user, ad size, user cookie, etc, that are used for targeting purposes. The demand side platform then processes hundreds of ads in their system, supplied by advertiser clients along with desired filtering/targeting parameters, against information parameters supplied by the partner, and filters out any ads that do not qualify (for example the ad does not want to target youtube.com®). For ads that are not removed due to a mismatch with targeting parameters, the demand-side platform then evaluates the corresponding bids that represent how much each client advertiser is willing to pay. The winning bid in the internal auction is then sent to the external auction to compete for the impression opportunity.

An electronic advertising agency/consolidator operating a demand-side platform typically charges their advertiser/clients based on impressions after the fact. They have not previously been known to guarantee the reach of a campaign ahead of time—and do so at a guaranteed price.

Note that in some scenarios, the electronic advertising agency/consolidator operating a demand-side platform and the advertiser/client may in fact be the same entity—for instance when they comprise a large organization with an internal advertising department capable of acting as a demand-side platform. Also, in such an instance, there may be no internal auction—just a submission to an external auction.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

Figure 1:
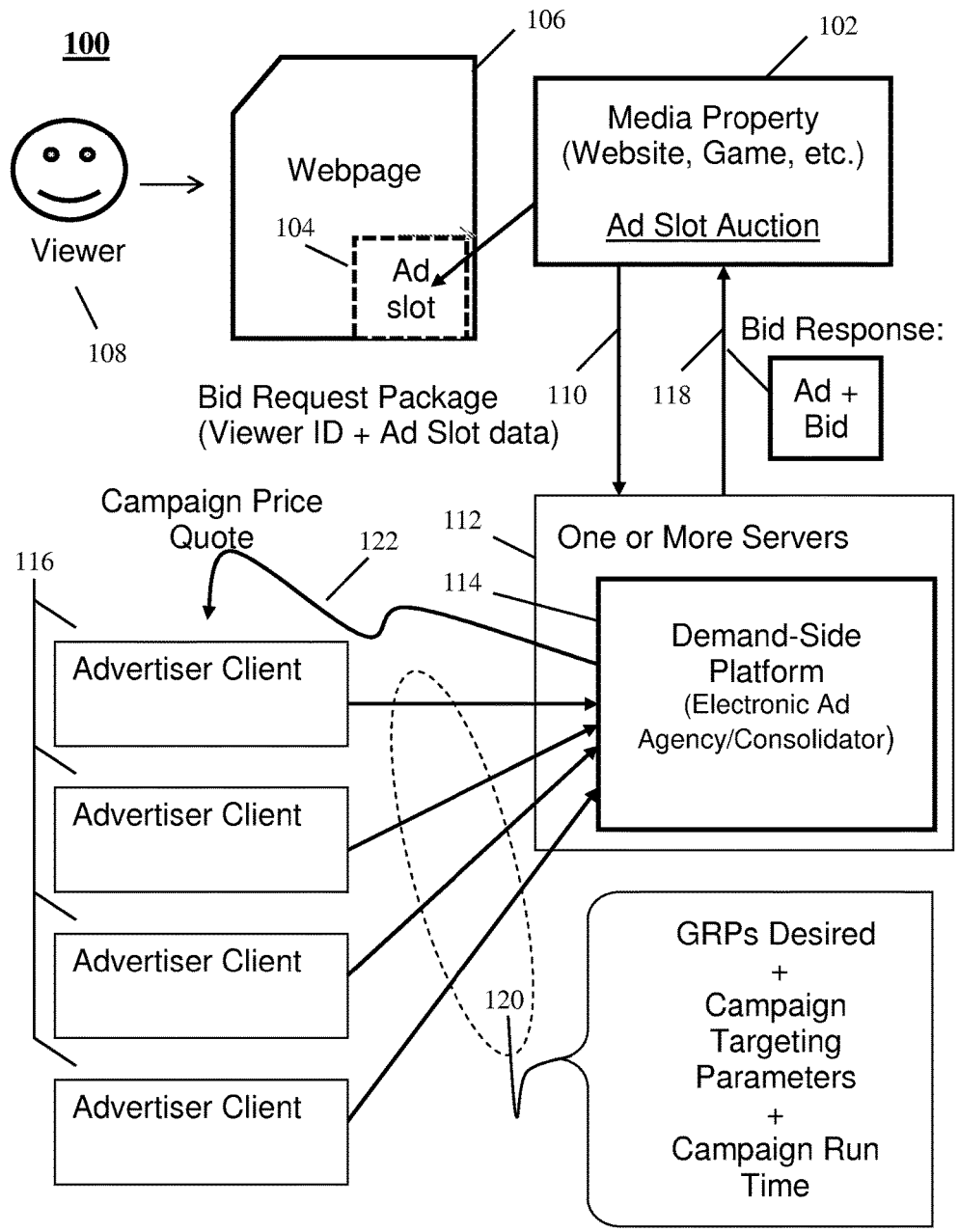
FIG. 1 shows an overview block diagram showing system components and data flow for a demand side platform according to the invention.

Systems and methods are disclosed for characterizing websites and viewers, for predicting GRPs (Gross Rating Points) for online advertising media campaigns, and for pricing media campaigns according to GRPs delivered as opposed to impressions delivered. To predict GRPs for a campaign, systems and methods are disclosed for first characterizing polarized websites and then characterizing polarized viewers. To accomplish this, a truth set of viewers with known characteristics is first established and then compared with historic and current media viewing activity to determine a degree of polarity for different Media Properties (MPs)—typically websites offering ads—with respect to gender and age bias. A broader base of polarized viewers is then characterized for age and gender bias, and their propensity to visit a polarized MP is rated. Based on observed and calculated parameters, a GRP total is then predicted and priced to a client/advertiser for an online ad campaign.

Even if a polarization profile for a specific viewer is not known, it is useful to understand the polarization profile or probability for a website where that viewer is about to be offered an ad impression, and a GRP expectation can be computed for such scenarios as described herein. Further, creating a database of polarized websites that have each been profiled according to their polarization probabilities with respect to certain Viewer Characteristics (VCs) is useful not only in estimating GRPs for a campaign. It is also useful as a component of an exemplary process as described herein for profiling unknown viewers in order to classify them and create a database of polarized viewers.

Profiling Polarization of Media Properties

A key function of the processes described herein is to determine the "polarization" of a Media Property. A Media Property or MP represents a specific instance of a media platform for electronically delivering information to a viewer. An MP as referenced herein usually refers to a website or URL on the Internet, however may also refer for example and without limitation to an App ID, a Game ID, or other electronic media including for example electronic billboards. Polarization in general refers to the extent that a particular MP, or as will later be described, a particular viewer, has characteristics that are biased (or not biased) with respect to certain targeting criteria. Polarization ratings are usually expressed in terms of probability percentages—however other rating methods may be used. Targeting characteristics most commonly utilized for polarity rating are typically age and gender, although other characteristics may be also rated without limitation. Viewer age is typically broken down into age brackets, for example 12-17, 18-34, 35-44, etc. Viewers are commonly identified by their electronic "cookie" passed from their computer to a site they are visiting, and as such a process for classification of viewers according to various viewer characteristics is sometimes known as "cookie bucketing". Note that a particular viewer may in fact use multiple computers and therefore have multiple cookies. While multiple cookies may typically treated as multiple viewers, it is possible to treat them as the same viewer if sufficient information on a viewer and their computer use is known. For the sake of non-limiting examples presented herein, each cookie is assumed to represent a different viewer and the terms "viewer" and "cookie" are assumed to be synonymous.

FIG. 1 shows an overview block diagram describing system components and data flow for a demand side platform according to the invention with a focus on information conveyed relative to polarization profiling of MPs and viewers, and for estimating and quoting GRPs (Gross Rating Points) to an advertiser client 116 provided by a demand-side platform 114. GRP estimation according to the invention includes first establishing databases of known polarized MPs as well as a database of known polarized viewers as described with respect to FIGS. 2 and 3. Per FIG. 1, an ad slot opportunity 104 on a webpage 106 offered by an exemplary media property 102 is offered in an auction for an impression opportunity. Here, an advertisement is to be placed in ad slot 104 on webpage 106 to be viewed by a specific viewer 108. Media property 102 sends a bid request package 110 consisting of viewer identification information for viewer 108 and criteria specific to ad slot 104. This bid request package is received on one or more servers 112 where the demand-side platform 114 operates, and this information is processed thereon. Subsequently, if the impression opportunity fits the targeting criteria of one or more advertiser clients 116, the demand-side platform will respond with a bid response 118 which includes the advertisement itself as well as a bid price.

This particular impression opportunity may fit with a previously defined advertising campaign for one or more advertiser clients 116. For such campaigns, the demand-side platform 114 may have previously provided a price quote 122 for such campaign. As opposed to simply quoting impressions to be purchased, according to the invention such a campaign may be quoted in terms of GRPs delivered, essentially guaranteeing viewing reach for specific targeting criteria. In order to receive such a campaign price quote 122, an advertiser client 116 would have previously delivered to the demand-side platform a request for a quotation including information package 120. Information package 120 includes for example and without limitation: GRPs desired; campaign targeting parameters; and campaign runtime.

Figure 2:
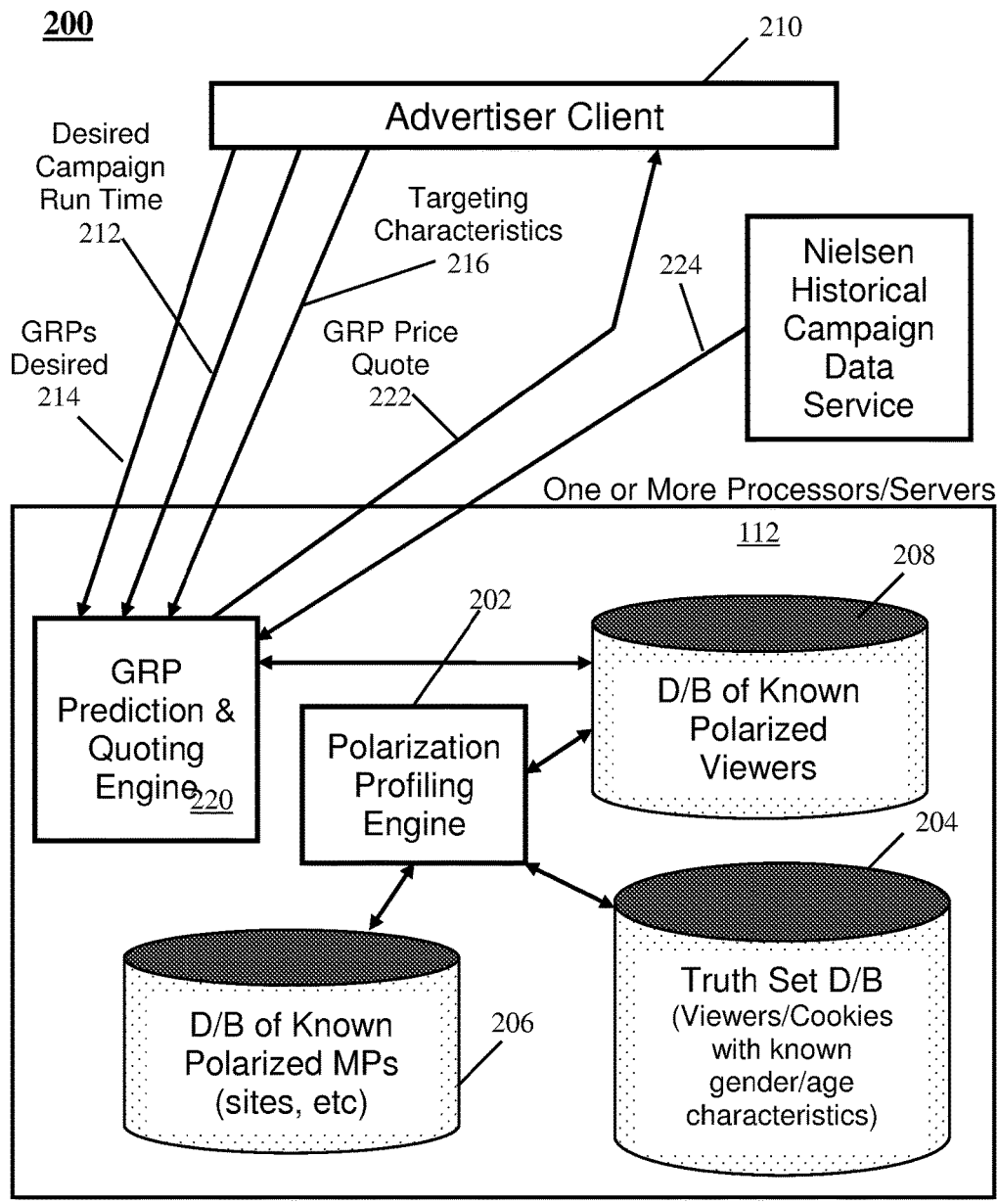
FIG. 2 shows an overview block diagram showing system components and data flow for website and viewer polarization profiling as well as GRP prediction and quoting according to the invention.

FIG. 2 shows an overview block diagram describing system components and data flow for website and viewer polarization profiling as well as GRP prediction and quoting according to the invention. Here, a polarization profiling engine 202 operating on one or more processors/servers 112 operates according to the exemplary flow described in FIG. 3, first creating a database of polarized MPs 206 based on the activity of viewers in truth set 204. Viewers in truth set 204 are characterized at least by gender, however may also be characterized for example and without limitation by age, geographic locations ("geos"), and other characteristics. Subsequently a database of known polarized viewers 208 is created by the polarization profiling engine. Optionally, look-alike viewers may be categorized as described herein and added to the database of known viewers based on comparing with known polarized viewers.

Subsequently, an advertiser client 210 may supply an information package 120 to the demand-side platform including a desired campaign runtime 212, a quantity of GRPs desired 214 for a campaign, and targeting characteristics 216 for the campaign. In response, GRP prediction and quoting engine 220 operating on one or more processors/servers 112 provides a GRP price quote 222 to advertiser client 210. Should the advertiser client find the quote acceptable they will normally proceed to engage with the demand-side platform to execute the campaign. When the campaign is completed, a package of historical campaign data 224 is obtained from Nielsen® in order to validate the reach of the campaign.

Figure 3:
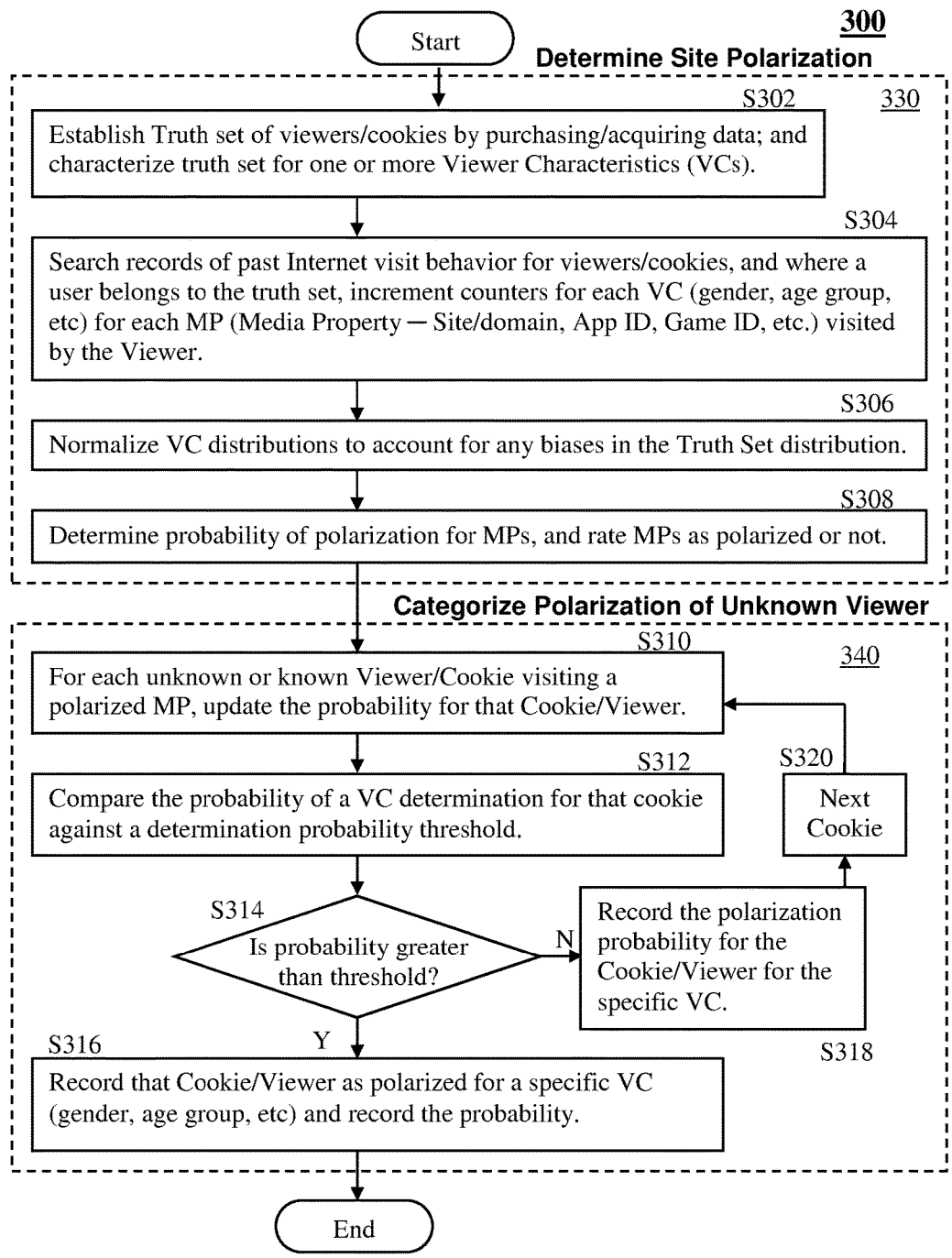
FIG. 3 shows a flowchart with exemplary and non-limiting methods described for the determination of site polarization as well as determination of polarization for unknown viewers in order to classify them as known polarized viewers.

As shown in flowchart 300 of FIG. 3, a first phase of an exemplary and non-limiting polarization characterization process according to the invention involves a determination 330 of polarization characteristics for different MPs (typically websites) that viewers may visit. Within this process, a first step is to establish 302 a "Truth Set" of viewers/cookies by purchasing or otherwise acquiring data. A truth set is a database of specific viewers including their cookies and known characteristics for those viewers such as for example age and gender. Once a truth set is available, it is then characterized for one or more Viewer Characteristics (VCs) per step S302.

Subsequently per step S304, records of past Internet visits are searched and analyzed relative to the behavior of different viewers going back in time by a specified number of months. Where a viewer in the records of past Internet visits belongs to the truth set, counters are incremented for each VC (gender, age group, etc) for each MP (Media Property—Site/domain, App ID, Game ID, etc.) visited by the viewer. Once this process is finished, at least an empirical male/female frequency or probability has been established for every Media Property matched by at least one viewer/cookie from the truth set. In a similar way, each MP is also profiled for polarization with respect to viewers/visitors in different age brackets and any other VC category of interest.

With respect to for instance gender, statistically the gender distribution is expected to be approximately 50:50 in the general Internet populace, and therefore it is appropriate to then normalize 306 distributions for each media property to account for any biases in the Truth Set distribution. In order to accomplish this, the gains to be applied to the Male and Female probabilities are computed as follows:

First, the number of viewers/cookies representing the "Least Frequent Gender" is calculated to be equal to the minimum number of either the (Females in the Truth Set) or the (Males in the Truth Set). Then the gain factor for each gender subset is calculated as follows:

$$\text{Gain for Females} = \text{Least Frequent Gender}/\text{Females in Truth Set}$$

$$\text{Gain for Males} = \text{Least Frequent Gender}/\text{Males in Truth Set}$$

Then, the Unbiased Probability ("P") for each gender at each media property (MP) is determined 5308 as follows:

$$P(\text{Female}) \text{ for MP} = \text{Gain for Females}*(\text{Female Count for MP}/\text{Total Cookies at MP})$$

$$P(\text{Male}) \text{ for MP} = \text{Gain for Males}*(\text{Male Count for MP}/\text{Total Cookies at MP})$$

At this point, a database of polarized MPs has been created where for each MP, a polarization probability exists for each VC for which a characterization determination was performed with respect to the truth set. One embodiment of GRP prediction and quoting utilizes this polarized MP database to calculate predicted GRP reach for a proposed campaign and to create a price quote for that campaign.

After an initial classification process for polarized websites using the truth set per FIG. 3, MPs may be further "bucketed" or classified each time a viewer in the truth set visits a website, therefore further enhancing the classification accuracy for any MP so visited.

Polarization Profiling of Viewers

In predicting the results of a campaign it can be especially useful if the polarization of a potential viewer is understood when impression opportunities arise on a particular MP for that viewer. As such, it is useful to profile and classify unknown viewers with respect to VCs and build a database of known polarized viewers including a probability of polarization with respect to different VCs for each polarized viewer.

Choosing a set of MPs (media properties) that will allow the profiling of viewers/cookies that are not members of the truth set is done as follows:

Per step 308, all MPs are identified whose unbiased distributions are highly polarized towards Male or Female (or towards any other VCs being analyzed), and these are rated as "polarized". Stereotypical examples of websites (MPs) exhibiting extreme degrees of polarization include for instance: Sports-oriented for Males; and Fashion-oriented for Females.

To accomplish this, a threshold is applied to the dominant gender, that is, if the value of:

$$\text{Max}(P(\text{Female}), P(\text{Male}))$$

is greater than a predefined threshold, for example and without limitation 0.80, then the MP is added to the Polarized Set with respect to the VC being analyzed—for instance in this example, gender. This typically results in 100s to 1000s of media properties being added to a database of polarized MPs, with varying levels of traffic being categorized as "polarized" or not. In all cases, the polarization probability for an MP with respect to each VC is recorded, and this is useful in some embodiments of GRP estimation and quoting when not all sites chosen by an advertiser/client are highly polarized, and some sites with only moderate polarization must be included in order to fulfill the reach and/or time frame requirements of a campaign.

To categorize 340 any unknown viewer/cookie for VC polarization probability, for example gender (Male or Female), an exemplary process according to the invention keeps a running probability for each of them. By default the distribution is set at:

$$P(\text{Female})=0.5 | P(\text{Male})=0.5$$

Each time that a cookie/viewer is seen viewing a polarized MP, the probabilities for that cookie/viewer are updated S310 as follows (with the assumption that each auction is statistically independent):

$$P(\text{Male})'=P(\text{Male})*\text{Polarized Site } P(\text{Male})$$

$$P(\text{Female})'=P(\text{Female})*\text{Polarized Site } P(\text{Female})$$

where the:

$$\text{Denominator for Normalization}=P(\text{Male})'+P(\text{Female})'$$

Therefore:

$$P(\text{Male})'=P(\text{Male})'/\text{Denominator for Normalization}$$

$$P(\text{Female})'=P(\text{Female})'/\text{Denominator for Normalization}$$

which guarantees that the definition of probability holds, that is:

$$P(\text{Male})'+P(\text{Female})'=1$$

Each time that a cookie/viewer is seen visiting a polarized site, the probabilities are re-adjusted. Multiple hits on highly polarized sites of the same orientation rapidly result in gender assessments with probability generally exceeding 0.95.

Finally, any time it becomes useful to delineate a male or female segment from the database of classified polarized viewers/cookies, all members are analyzed and their probabilities for a particular VC are compared S312 with a threshold for whichever direction is dominant for the particular VC, for example in the case of gender, Max(P(Female), P(Male)).

The chosen threshold value corresponds directly to the predicted overall accuracy for the segment, while the expected accuracy for gender (Male and Female) for example, is equal to the mean probability across all chosen viewers/cookies. One exemplary and non-limiting threshold would be 0.92, but it can be lowered to increase the size of the pool (reach) traded off against accuracy.

Per step S314, for a cookie/viewer and a particular VC, if the polarization probability is greater S314 than the threshold value, that Cookie/Viewer is recorded S316 as polarized for the specific VC (gender, age group, etc) with the specific probability value also being optionally recorded in the known viewer database. If on the other hand, that cookie/viewer has a polarization probability less than the threshold value, then the probability value for that Cookie/Viewer may be still optionally recorded S318 for the specific VC (gender, age group, etc) in the known viewer database. After either steps 316 or S318, the next cookie/viewer S320 is analyzed per step 310.

Note that it is preferable that multiple cookie/site hits are not recorded, so hitting the same site again and again won't change a viewer's probabilities. Also note that it is significant that only highly polarized MPs are considered as "polarized"—using all probabilities would result in a per-cookie assessment in which the biases would be drowned out by the more frequently seen sites that are not polarized.

Figure 4:
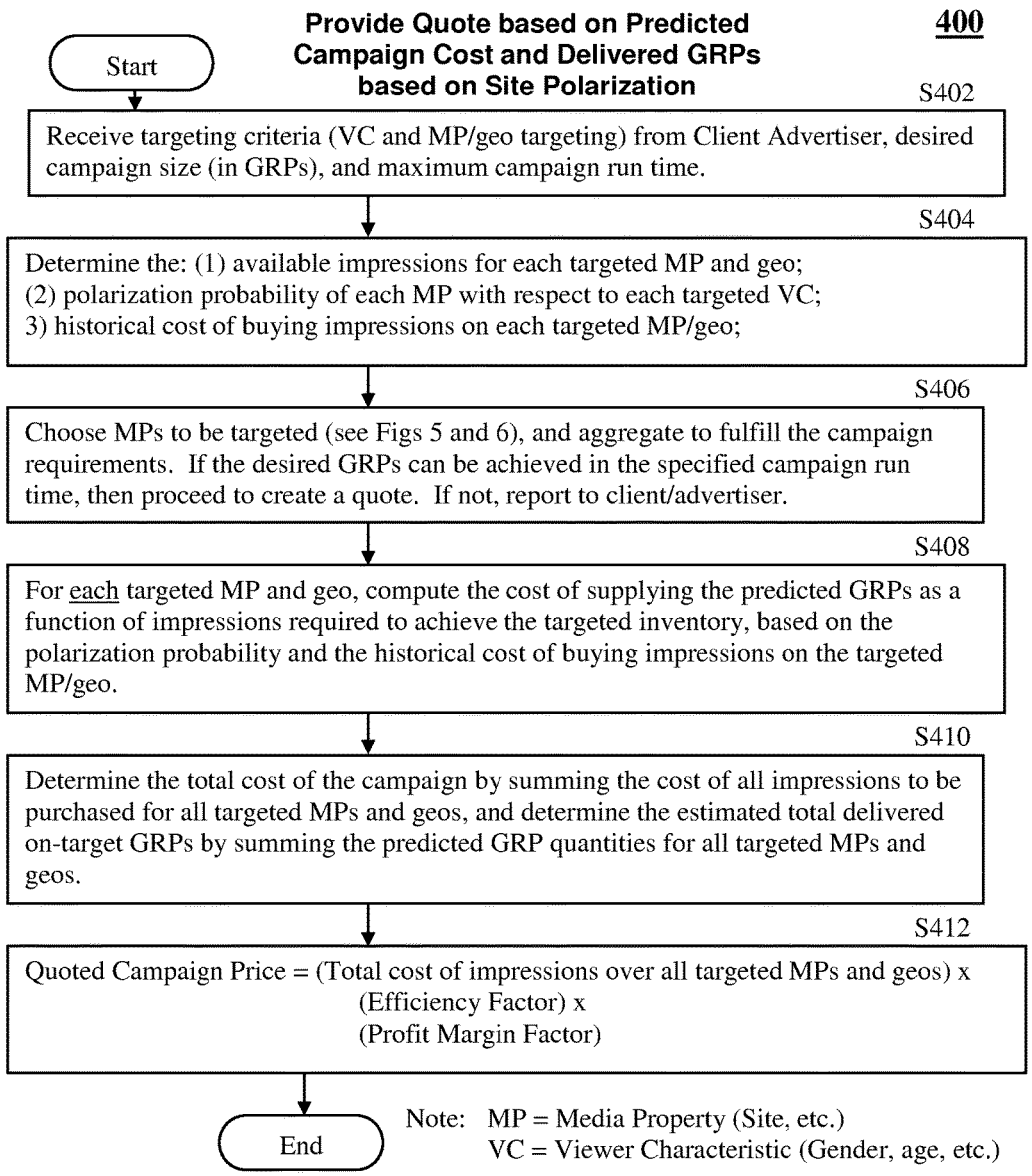
FIG. 4 shows a flowchart for the process whereby prices quoted to an advertiser client for on-target GRPs delivered for an electronic advertising campaign based on site polarization profiles.

Once a set of viewers/cookies has been thus classified with high accuracy, they can be used as a further means to profile MPs for polarity in a manner similar to how the truth set is utilized per the process of FIG. 4. In this case however, since unlike the truth set each VC for a particular polarized viewer is typically less than 100% probable, the analysis must take into account the probability for each VC for a particular viewer/cookie being used.

Also, the approach can extend beyond just sites/apps/games to partial URLs, verticals and any other attributes that are available in auction protocols. Furthermore, with the appropriate truth set, classification can be extended to age brackets, marital status, children in household, etc.

Extensions of the methods described herein include, for example, where the number of classified viewers/cookies in the known viewer database is increased by adding "look-alikes". Here, cookies/viewers that did not hit any polarized sites are classified based on similar behavior to classified cookies where the classified cookies have a probability established for different VCs.

Determining Look-Alike Viewers Based on Polarized Viewers

Look-Alike modeling has been used for some time in advertising campaigns and is currently used in electronic and online advertising. In general, look-alike modeling includes selection of a trait or target segment and data sources for analysis, including a baseline population database for comparison. The analysis looks for viewers in the data sources that are identical or similar to viewers in the baseline population with respect to the selected trait or target segment. Then, newly discovered traits are ranked in order of influence or desirability. The ranking may be a number between, for instance, 0 to 1. Ranks closer to 1 means they are more like the audience in the baseline population. Also, heavily weighted traits are valuable because they represent new, unique viewers who may behave similarly to the established audience represented in the baseline population. The result is a database of "Look-Alike Viewers" who have characteristics similar to those in a well-characterized baseline population. For the invention, the baseline population is typically the database of known, polarized viewers. Adding look-alike viewers to the database of known viewers enables larger campaigns to be addressed where the database of known polarized viewers alone is not large enough to meet the campaign requirements in terms of reach and/or run time. Also, since a look-alike viewer has not been profiled by the method described for FIG. 3, the polarization probability for a look-alike viewer may optionally be down-graded relative to that of the known polarized viewers that were used to determine the look-alike viewer. For example if the male gender assessment for known male polarized viewers is 95%, then the gender assessment for a look-alike polarized viewers might for example be 80%.

Predicting, Pricing, and Selling GRPs

While ad campaigns historically are priced by impressions, an impression does not guarantee that a targeted viewer has interacted with the MP. The ability to purchase an ad campaign and know that the reach (on-target viewed ads) is guaranteed would be advantageous for an advertiser. For a demand-side-platform or online ad agency to price according to GRPs or "reach", requires a statistical confidence in the ability to supply a given degree of on-target reach for a given number of impressions purchased, in order to offer such a service at a profit. An on-target view is one where the viewer's characteristics match the targeted characteristics of a campaign. For instance, if an ad campaign is for men's sporting goods, male viewers are typically targeted. When an impression is presented to a female, such a viewing would NOT be on-target for that campaign.

A large historical database is required to support an offering capable of guaranteeing a level of GRP reach, so that the cost of reaching specific categories of viewer can be predicted with an acceptable level of statistical probability. According to one exemplary and non-limiting embodiment of the invention, viewer activity is bucketed over an extensive period of time where MPs (Sites) are profiled according to characteristics (age bracket, gender, etc.) of visiting viewers, and a degree of "polarization" is established for each MP with respect to each viewer characteristic (VC).

Viewers are classified according to their propensity or polarization to visit polarized websites, with respect to each VC type. Systems and methods for creating such databases are described herein with respect to FIGS. 1-3. The cost of each viewer interaction is also accumulated. Thus, a historical summary may be referenced that indicates how many MPs are historically in a bucket (classification category), and the cost of reaching those viewers. For any VC with respect to either an MP or a known viewer, a polarization probability—typically described as a fraction or percentage—is available as a result of the processes described with respect to FIGS. 1-3.

The definition of GRPs (Gross Rating Points) for online advertising such as that addressed herein, is (Reach×Frequency), defined more specifically as:

(number of unique views/online population segment or specific target audience)×(average exposures per viewer over the course of the campaign)

The process of quoting a GRP campaign to a client/advertiser begins with step S402 of flowchart 400 of FIG. 4, where a demand-side platform or online advertising agency receives targeting criteria from the advertiser client. This targeting criteria includes desired VC targeting as well as any MPs and specific geographic locations (geos) the client desires to target. A maximum runtime for the campaign is also included. The desired campaign size (reach) in GRPs may also be provided by the advertiser client. Subsequently according to exemplary and non-limiting embodiments described herein the demand-side platform provides a quotation (price) for GRPs that are "on target"—in other words the reach for the campaign is guaranteed to include viewers that possess the specific targeting characteristics specified by the client/advertiser.

In step S404, the demand-side platform determines the available impressions for each targeted MP and Geo as well as the polarization probability of each targeted MP with respect to each targeted VC, and the historical cost of buying impressions on each of the targeted MPs. Specific MPs to be targeted for the campaign are chosen 406 according to flowcharts 500 and 600 of FIGS. 5 and 6 respectively. Per FIGS. 5 and 6, MPs are chosen and aggregated either based on client selection and/or automatically based on the historical cost in proportion to the polarization probability for an MP (typically described by $ per % point). At the start, the client may supply a list of MPs and geos from which the demand side platform may choose automatically in order to assemble a possible campaign (per FIG. 5), or alternately, the client may specifically choose each MP and Geo that are to be part of the campaign (per FIG. 6).

Per S406 the total number of impressions that must be purchased to achieve the desired level of on-target GRPs is then determined. Subsequently in S406 it is determined if the desired GRPs can be achieved in the specified campaign run time. If that is the case, the process proceeds to step S408. If desired on-target GRPs cannot be achieved, this result is reported to the client/advertiser.

To create a price quotation, per S408 each targeted MP and Geo are examined to determine the cost of supplying the predicted GRPs as a function of impressions required to achieve the targeted inventory, based on the polarization probability and the historical cost of buying impressions on the targeted MP/geo. In general, "inventory" is the quantity of impressions typically available on a specific MP during a specified campaign run time. This is determined historically and the most relevant data is typically the most recent.

In general, since the polarization probability of any MP is less than 100% for any VC, a larger number of impressions will need to be purchased in order to achieve the desired number of on-target views required to provide the requested GRPs. For example, a campaign may find that 10,000 impressions are available on YouTube during the campaign run time. YouTube has a polarization probability value of 0.45 for Males (45% of the audience is male), so if 10,000 impressions are purchased on YouTube for a male-targeted campaign, the on-target impressions are 4,500 and the potential wastage is 5,500. The cost of providing the 4,500 on-target impressions is the calculated as the cost of purchasing 10,000 impressions. The number of impressions to be purchased for an MP is therefore equal to the desired on-target impressions divided by the polarization probability for that MP with respect to a targeted VC, the polarization probability being expressed as a fraction representing a probability percentage. Also, when a campaign is targeting more than one VC—for instance males plus a specific age bracket such as 18-25—the polarization probabilities for both VC should be taken into account for that VC. One exemplary and non-limiting method to combine the effect of both VCs is to multiply the polarization probabilities to produce a composite polarization probability for the MP with respect to that specific campaign.

Per S410, the total cost of the campaign is then determined by summing the cost of all impressions to be purchased for all targeted MPs and geos, and the estimated total number of delivered on-target GRPs is determined by summing the predicted GRP quantities for all targeted MPs and geos.

Finally per S412, a Campaign Price to be quoted is computed according to the following exemplary and non-limiting formula:

Quoted Campaign Price=(Total cost of impressions over all targeted MPs and geos)×(Efficiency Factor)×(Profit Margin Factor)

Here, the efficiency factor and profit margin factor are variable and may be altered by the demand-side platform from one campaign to another depending upon campaign results and other factors. A method for adjusting the efficiency factor from time to time is described by the process shown in FIG. 7.

Figure 5:
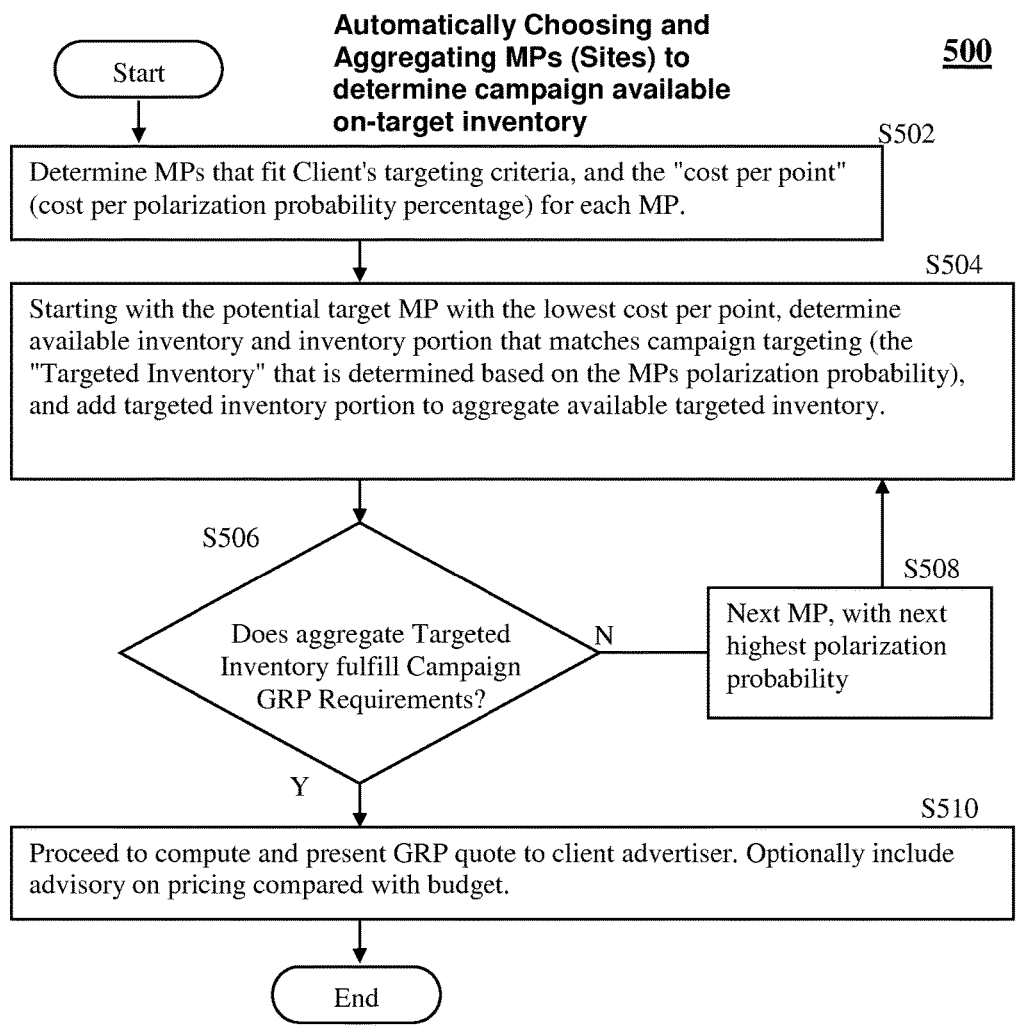
FIG. 5 shows an exemplary process for choosing and aggregating Media Properties (MPs) automatically to determine available campaign inventory.
Figure 6:
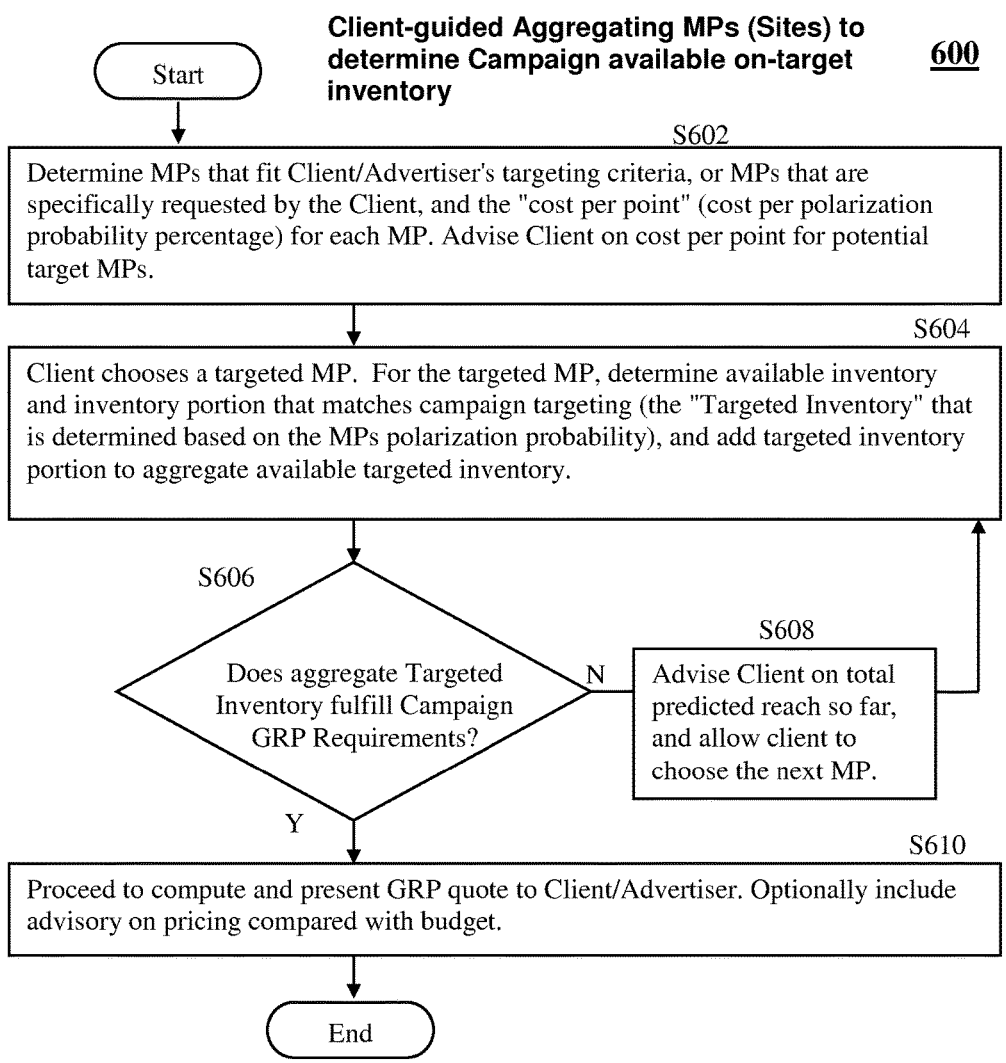
FIG. 6 shows an exemplary process for choosing and aggregating MPs to determine available campaign inventory wherein a client specifically chooses MPs to be included in the campaign.

FIGS. 5 and 6 show flowcharts for processes whereby MPs are chosen and aggregated to determine a total quantity of on-target inventory that is available for a specific campaign.

FIG. 5 shows a process whereby a demand-side platform may automatically choose which MPs are used in a campaign, either from a list of possible MPs supplied by a client/advertiser, or alternately from all possible MPs that have previously been profiled for polarization. According to an alternate embodiment, the process may mix MPs specified by the advertiser/client with other MPs having known polarization profiles in order to assemble a campaign. Typically, a client/advertiser will choose which of these alternatives they would like the demand-side platform to utilize in assembling a campaign.

According to flow chart 500 of FIG. 5, a system according to the invention automatically determines 502 MPs that fit a client's targeting criteria, and also determines the "cost per point" or cost per polarization probability percentage for each MP. Thus when selecting MPs to add to the campaign, the system can qualify the cost-effectiveness of each such addition. If the polarization percentage or probability was the sole factor evaluated in determining which MPs to add to the campaign, a highly polarized site might be added but have such an extreme cost that it consumes the campaign budget well before the desired number of on-target impressions has been reached. As a result it is preferable to prioritize the addition of MPs to a campaign according to the cost-per-point rather than simply on polarization probability.

For any MP, there is a relationship in aggregate between winnable impressions and CPM bid, and this data is accumulated over time and is available to help determine what inventory is available at a bid price. This is used to estimate how many impressions are buyable at any CPM bid. This data may be utilized for determining available impressions and cost. Thus, if an MP does not have enough targeted inventory at a given bid price point, the bid price can be raised to produce more inventory, however at a higher cost-per-point. Thus, the bid price may be adjusted by the client/advertiser or automatically by the system in order to provide more inventory from highly desirable polarized sites.

Per step S504, the process starts by identifying the potential target MP having the lowest cost per point, and determining for that MP the available inventory as well as that portion of the available inventory that matches the campaign targeting criteria. This portion then becomes the "on target" inventory or "targeted inventory" and is determined based on the MPs polarization probability. For example during the runtime allocated for a campaign, assume that an MP called "X" historically would have 10,000 impressions available. If the polarization percentage for MP "X" is 60% for a VC describing male viewership and the campaign in question is targeting male viewers, then during the runtime for the campaign it follows that there will be 6,000 on-target viewers receiving impressions. The campaign will however have to pay for the entire 10,000 impressions in order to provide the 6,000 on target impressions. After this MP having the lowest cost-per-point has been added to the campaign, the system evaluates S506 whether or not the aggregated on-target inventory fills the campaign GRP requirements. If not, the flow proceeds S508 to locate the next MP having the next lowest cost-per-point where the polarization is in line with campaign targeting. Subsequently step S504 is executed again for this next MP.

Upon adding an MP to the campaign, should it be determined per step S506 that the campaign GRP requirements would be fulfilled, the flow proceeds to S510 where a quotation for the campaign in terms of price and GRPs is prepared and provided to the client/advertiser. Optionally the client/advertiser will be advised on how the quoted price compares with any established budget.

According to flow chart 600 of FIG. 6, a Client/Advertiser supplies a list of MPs to be targeted and may specifically add MPs to a campaign. The system according to the invention automatically determines 502 the "cost per point" or cost per polarization probability percentage for each MP, and advises the client. Thus when selecting MPs to add to the campaign, the Client can be aware of the cost-effectiveness of each such addition.

Per step S604, a client chooses a targeted MP to add to the campaign. For the targeted MP, the system according to the invention then determines available inventory and the inventory portion that matches campaign targeting (the "Targeted Inventory" that is determined based on the MPs polarization probability). This targeted inventory portion is then aggregated into the available targeted inventory.

After this MP has been added to the campaign, the system evaluates S606 whether or not the aggregated on-target inventory fulfills the campaign GRP requirements. If not, the flow proceeds S608 where the client is advised on total predicted reach so far, and the client proceeds to choose the next MP to add to the campaign. The flow then reverts to step S604 where the client chooses another MP to add to the campaign.

Upon adding an MP to the campaign, should the system according to the invention determine per step S606 that the campaign GRP requirements would be fulfilled, the flow proceeds to S610 where a quotation for the campaign in terms of price and GRPs is prepared and provided to the client/advertiser. Optionally the client/advertiser will be also advised on how the quoted price compares with any established budget.

A simplified example might include a campaign that has two target sites. Site #1 has a polarization factor of 60% male and site #2 has a polarization factor of 70% male. The campaign is targeting males. So, for site #1 the campaign would need to purchase 100 impressions to get 60 on target, and for site #2 the campaign would we need to purchase 100 impressions to get 70 on target. If the campaign goal was to reach 130 on target impressions, 60 would be from site #1 and 70 from site #2. If the campaign goal was higher, but the available inventory on sites #1 and #2 was only 100 impressions each, the demand side platform would tell the client that only 130 on-target impressions can be delivered unless they add more sites to the campaign. Also for this simplified example, according to FIG. 5 site #2 would be added to the campaign before site #1.

Figure 7:
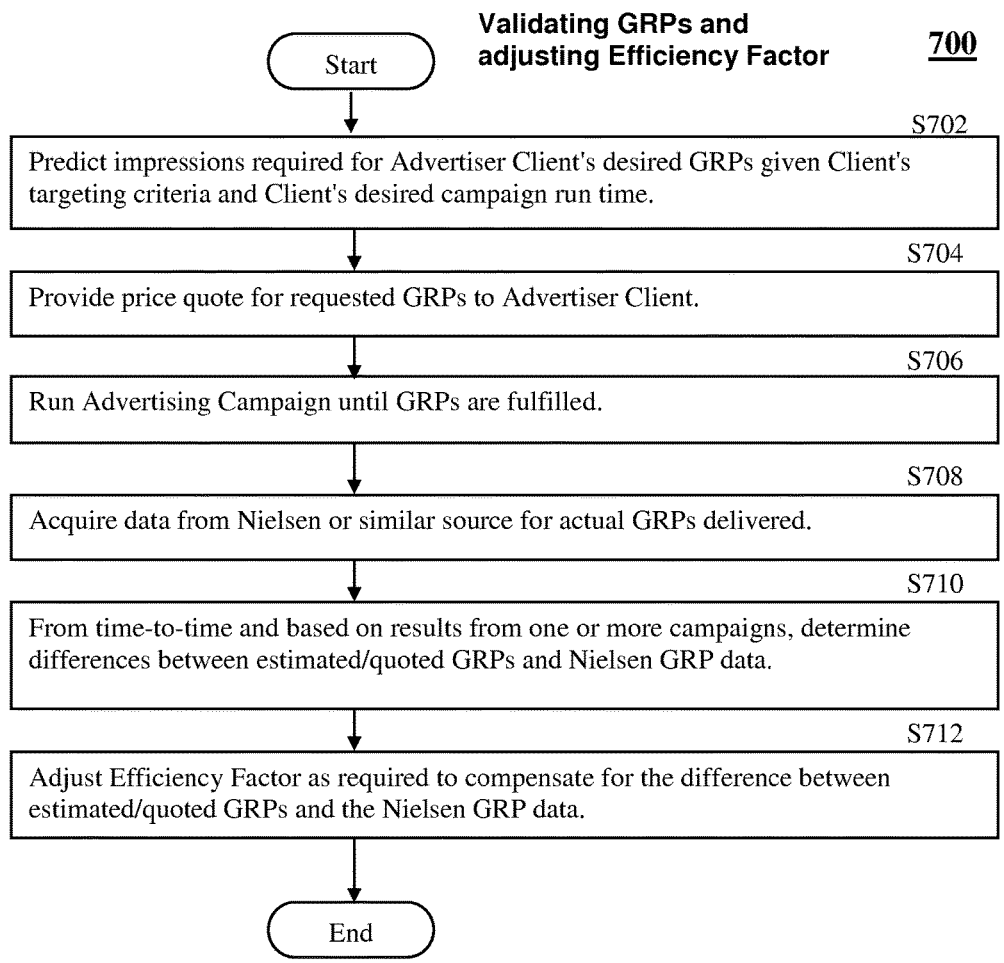
FIG. 7 shows an exemplary process for operating an electronic advertising campaign whereby a quantity of on-target GRPs are provided to a client advertiser at a predetermined quoted price, and from time to time after a campaign has been completed, an Efficiency Factor is adjusted based on GRP data acquired from a third party such as for example, Nielsen.

The overall flow for operation of an electronic advertising campaign according to an exemplary embodiment of the invention is shown in FIG. 7, including validation of GRPs delivered and adjustment of an efficiency factor. As mentioned earlier, information is typically available from third-party organizations such as Nielsen after an advertising campaign has been run that quantify the reach or GRPs achieved by the campaign. Since the method for estimating and providing a GRP quote before a campaign has run involves statistical predictability, the ability to reconcile with actual achieved reach after a campaign is implemented through the "efficiency factor" is an important component of the process. As the efficiency factor is adjusted from time to time comparing predicted results with real results, the ability to predict future campaigns with greater accuracy is improved. By performing this reconciliation from time to time and not after each campaign has run, the efficiency factor is adjusted in a controlled environment rather than on random campaigns. This avoids the possibility that individual campaigns may have unique or even aberrant differences that would throw off the result to some extent.

Per flow chart 700 of FIG. 7, impressions required to be purchased to achieve an advertiser/client's desired GRP amount are estimated S702 given the client's targeting criteria and the client's desired campaign run time. In step S704, a price quote for requested GRPs is provided to the advertiser/client. Per step S706, the advertising campaign is run until the required GRPs are achieved or until the budget is spent. Then, in step 708, data is acquired from Nielsen or a similar source including actual GRPs delivered for the campaign. In step 710, from time-to-time and based on results from one or more campaigns, the difference between GRPs estimated prior to campaigns and the Nielsen data for GRPs actually delivered is calculated. A comparison can also be made between the Nielsen GRP data and GRPs recorded by the demand side platform for each campaign. Finally per step S712, the Efficiency Factor is adjusted as required to compensate for the differences between estimated/quoted GRPs and Nielsen GRP data, or alternately between GRPs delivered as recorded by the demand side platform and the Nielsen GRP data.

Quoting GRPs Based on MP Polarization and Viewer Polarization

When campaign reach is estimated based only on site polarization profiles, determining the available on-target inventory for a campaign is performed with respect to FIGS. 4-6. For these estimates, the process is limited to the polarization of the sites. If a site has a 60% male polarization and a campaign is targeting males, then on average it is expected that up to 40% of the impressions purchased on this site will be essentially wasted. In order to get the on-target rate above that of the sites themselves, it is necessary to also take into account the polarization of the viewers in the known viewer database, and pass over unknown viewers to focus on known polarized (or look-alike polarized) viewers.

At the same time, if the campaign passes over unknown viewers in favor of known polarized viewers, the effective available inventory could go down significantly, and with it the statistical confidence that the requirements for a campaign being estimated and quoted can be fulfilled. One solution is to mix in some unknown viewers, and the strategy for mixing can be validated by comparing GRP results with pre-campaign estimations after campaigns are run in a similar way that the Efficiency Factor is utilized per FIG. 7.

Assuming the database of known viewers—including known polarized and look-alike polarized viewers—is large enough to encompass a majority of potential viewers of a campaign, and assuming that a campaign is targeting MPs that have a reasonable degree (above 70%) of polarization for targeted VCs, mixing in unknown viewers may not dilute the campaign significantly since it would be expected that polarized viewers would be visiting the polarized MP anyway.

To get substantial benefit from known viewers, a campaign would have to pass over unknown viewers at least in the early part of the operational period or run time of a campaign. As a campaign progresses, the viewers receiving ad impressions for the campaign on targeted sites can be tracked by a system according to the invention. As long as the success rate for on-target impressions is such that the campaign is on track to be fulfilled during the allotted run time, no additional unknown viewers would need to be mixed in. If the success rate drops below this, then unknown viewers would be added in including a larger percentage of wasted impressions.

Alternately, a campaign can start by targeting a mix of known and unknown viewers and then adjust the mix during the run-time based on the success rate for on-target impressions. How the initial mix is determined can depend on the polarization probabilities for targeted sites and the quantity of known polarized and look-alike polarized viewers in the known viewer database that match the targeting criteria. Again, the correlation between GRPs estimated prior to a campaign and GRPs delivered during a campaign is validated after a campaign by comparing with GRP data such as that supplied by Nielsen. If on average there are discrepancies, then the method for determining the initial mix of known and unknown viewers can be appropriately adjusted.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

At least certain principles of the invention can be implemented as hardware, firmware, software or any combination thereof. Moreover, the software is preferably implemented as an application program tangibly embodied on a program storage unit, a non-transitory user machine-readable medium, or a non-transitory machine-readable storage medium that can be in a form of a digital circuit, an analog circuit, a magnetic medium, or combination thereof. The application program may be uploaded to, and executed by, a machine comprising any suitable architecture. Preferably, the machine is implemented on a user machine platform having hardware such as one or more central processing units ("CPUs"), a memory, and input/output interfaces. The user machine platform may also include an operating system and microinstruction code. The various processes and functions described herein may be either part of the microinstruction code or part of the application program, or any combination thereof, which may be executed by a CPU, whether or not such user machine or processor is explicitly shown. In addition, various other peripheral units may be connected to the user machine platform such as an additional data storage unit and a printing unit.

What is claimed is:

1. In a digital medium environment of real-time bidding and selection of advertising opportunities corresponding to viewers simultaneously accessing websites via computing devices, a computerized method for efficiently providing digital bid responses and advertising over an online network in conducting online ad campaigns, comprising:
   determining a number of impressions to achieve desired gross rating points for an online ad campaign;
   bidding, by one or more processors during a first time period of a campaign run time for the online ad campaign, on a first plurality of known ad opportunities wherein the first plurality of known ad opportunities represent first plurality of known polarized viewers in a database of known polarized viewers;
   determining, during the first time period, that the desired gross rating points for the online ad campaign will not be fulfilled during the campaign run time utilizing the first plurality of known ad opportunities corresponding to the first plurality of known polarized viewers in the database;
   receiving, by the one or more processors, during a second time period of the campaign run time, a second plurality of known ad opportunities and a plurality of unknown ad opportunities from a remote server, wherein the second plurality of known ad opportunities corresponds to a second plurality of known polarized viewers in the database and the plurality of unknown ad opportunities corresponds to unknown viewers;
   based on the determination that the desired gross rating points for the online ad campaign will not be fulfilled during the campaign run time utilizing the first plurality of known ad opportunities corresponding to the first plurality of known polarized viewers, sending, by the one or more processors during the second time period, bid responses to the remote server for the second plurality of known ad opportunities and the plurality of unknown ad opportunities to increase a rate at which the number of impressions to achieve the desired gross rating points are being fulfilled; and
   providing a first advertisement for display to a first client device of a first viewer from the unknown viewers and a second advertisement for display to a second client device of a second viewer from the second plurality of known polarized viewers.

2. The computerized method of claim 1, further comprising:
   determining, for a first unknown ad opportunity of the plurality of unknown ad opportunities, that the first unknown ad opportunity corresponds to at least one polarized media property in a database of known polarized media properties; and
   sending a bid response for the first unknown ad opportunity in response to the determination that the first unknown ad opportunity corresponds to the at least one polarized media property in the database of known polarized media properties.

3. The computerized method of claim 1, further comprising:
   determining a targeted ratio of polarized viewer impressions to unknown viewer impressions to achieve the desired gross rating points for the online ad campaign; and sending the bid responses during the second time period based on the targeted ratio of polarized viewer impressions to unknown viewer impressions.

4. The computerized method of claim 3, further comprising:
tracking a number of on-target impressions achieved during the online ad campaign; and
adjusting the targeted ratio of polarized viewer impressions to unknown viewer impressions during execution of the online ad campaign based on the number of on-target impressions.

5. The computerized method of claim 4, further comprising:
comparing the desired gross rating points and an actual gross rating points delivered during the online ad campaign; and
determining an adjusted targeted ratio of polarized viewer impressions to unknown viewer impressions for a subsequent online campaign based on the comparison.

6. The computerized method of claim 5, further comprising executing the subsequent online campaign by sending bid responses based on the adjusted targeted ratio of polarized viewer impressions to unknown viewer impressions.

7. The computerized method of claim 1, wherein determining the number of impressions to achieve the desired gross rating points comprises:
establishing the database of known polarized viewers including viewer characteristics and polarization probabilities for the first plurality and second plurality of known polarized viewers;
identifying targeting parameters for the online ad campaign; and
determining the number of impressions to achieve the desired gross rating points for the online ad campaign based on the targeting parameters and the polarization probabilities for the first plurality and second plurality of known polarized viewers.

8. The computerized method of claim 1, wherein determining that the desired gross rating points for the online ad campaign will not be fulfilled during the campaign run time comprises:
monitoring the online ad campaign during the first time period to determine a success rate for the online ad campaign; and
determining that the success rate for the online ad campaign drops below a threshold on track rate.

9. A system comprising:
at least one processor; and
at least one non-transitory computer readable storage medium storing instructions that, when executed by the at least one processor, cause the system to:
determine a number of impressions to achieve desired gross rating points for an online ad campaign;
during a first time period of a campaign run time for the online ad campaign, bid on a first plurality of known ad opportunities corresponding to a first plurality of known polarized viewers in a database of known polarized viewers;
determine, during the first time period, that the desired gross rating points for the online ad campaign will not be fulfilled during the campaign run time utilizing the first plurality of known ad opportunities corresponding to the first plurality known polarized viewers in the database;
receive, during a second time period of the campaign run time, a second plurality of known ad opportunities and a plurality of unknown ad opportunities from a remote server, wherein the second plurality of known ad opportunities corresponds to a second plurality of known polarized viewers in the database and the plurality of unknown ad opportunities corresponds to unknown viewers; and
based on the determination that the desired gross rating points for the online ad campaign will not be fulfilled during the campaign run time utilizing the first plurality of known ad opportunities corresponding to the first plurality of known polarized viewers, sending, during the second time period, bid responses to the remote server for the second plurality of known ad opportunities and the plurality of unknown ad opportunities.

10. The system of claim 9, further comprising instructions that, when executed by the at least one processor, cause the system to send the bid responses by providing a first advertisement for display to a first client device of a first viewer from the unknown viewers and a second advertisement for display to a second client device of a second viewer from the second plurality of known polarized viewers.

11. The system of claim 9, further comprising instructions that, when executed by the at least one processor, cause the system to:
determine, for a first unknown ad opportunity of the plurality of unknown ad opportunities, that the first unknown ad opportunity corresponds to at least one polarized media property in a database of known polarized media properties; and
sending a bid response for the first unknown ad opportunity in response to the determination that the first unknown ad opportunity corresponds to the at least one polarized media property in the database of known polarized media properties.

12. The system of claim 9, further comprising instructions that, when executed by the at least one processor, cause the system to:
determine a targeted ratio of polarized viewer impressions to unknown viewer impressions to achieve the desired gross rating points for the online ad campaign; and
send the bid responses during the second time period based on the targeted ratio of polarized viewer impressions to unknown viewer impressions.

13. The system of claim 9, further comprising instructions that, when executed by the at least one processor, cause the system to:
track a number of on-target impressions achieved during the online ad campaign; and
adjust the targeted ratio of polarized viewer impressions to unknown viewer impressions during the campaign run time based on the number of on-target impressions.

14. The system of claim 13, further comprising instructions that, when executed by the at least one processor, cause the system to:
compare the desired gross rating points and an actual gross rating points delivered during the online ad campaign; and
determine an adjusted targeted ratio of polarized viewer impressions to unknown viewer impressions for a subsequent online campaign based on the comparison.

15. The system of claim 14, further comprising instructions that, when executed by the at least one processor, cause the system to: execute the subsequent online campaign by sending bid responses based on the adjusted targeted ratio of polarized viewer impressions to unknown viewer impressions.

16. The system of claim 14, further comprising instructions that, when executed by the at least one processor, cause the system to determine that the desired gross rating points for the online ad campaign will not be fulfilled during the campaign run time by:

monitoring the online ad campaign during the first time period to determine a success rate for the online ad campaign; and determining that the success rate for the online ad campaign drops below a threshold on track rate.

17. A non-transitory computer readable medium storing instructions thereon that, when executed by at least one processor, cause a computer system to:

determine a number of impressions to achieve desired gross rating points for an online ad campaign;

during a first time period of a campaign run time for the online ad campaign, bid on a first plurality of known ad opportunities corresponding to a first plurality of known polarized viewers in a database of known polarized viewers;

determine, during the first time period, that a success rate for the online ad campaign drops below a threshold on track rate;

receive, during a second time period of the campaign run time, a second plurality of known ad opportunities and a plurality of unknown ad opportunities from a remote server, wherein the second plurality of known ad opportunities corresponds to a second plurality of known polarized viewers in the database and the plurality of unknown ad opportunities correspond to unknown viewers; and based on the determination that the success rate for the online ad campaign drops below the threshold on track rate:

send bid responses to the remote server for the second plurality of known ad opportunities and the first plurality of unknown ad opportunities; and provide a first advertisement for display to a first client device of a first viewer from the unknown viewers and a second advertisement for display to a second client device of a second viewer from the second plurality of known polarized viewers.

18. The non-transitory computer readable medium of claim 17, further comprising instructions that, when executed by the at least one processor, cause the computer system to:

determine, for a first unknown ad opportunity of the plurality of unknown ad opportunities, that the first unknown ad opportunity corresponds to at least one polarized media property in a database of known polarized media properties; and sending a bid response for the first unknown ad opportunity in response to the determination that the first unknown ad opportunity corresponds to the at least one polarized media property in the database of known polarized media properties.

19. The non-transitory computer readable medium of claim 17, further comprising instructions that, when executed by the at least one processor, cause the computer system to:

determine a targeted ratio of polarized viewer impressions to unknown viewer impressions to achieve the desired gross rating points for the online ad campaign; and send the bid responses during the second time period based on the targeted ratio of polarized viewer impressions to unknown viewer impressions.

20. The non-transitory computer readable medium of claim 19, further comprising instructions that, when executed by the at least one processor, cause the computer system to:

track a number of on-target impressions achieved during the online ad campaign; and adjust the targeted ratio of polarized viewer impressions to unknown viewer impressions during the campaign run time based on the number of on-target impressions.

21. The non-transitory computer readable medium of claim 20, further comprising instructions that, when executed by the at least one processor, cause the computer system to:

compare the desired gross rating points and an actual gross rating points delivered during the online ad campaign; and determine an adjusted targeted ratio of polarized viewer impressions to unknown viewer impressions for a subsequent online campaign based on the comparison.

22. The non-transitory computer readable medium of claim 17, further comprising instructions that, when executed by the at least one processor, cause the computer system to determine the number of impressions to achieve the desired gross rating points comprises by:

establishing the database of known polarized viewers including viewer characteristics and polarization probabilities for the known polarized viewers;

identifying targeting parameters for the online ad campaign; and determining the number of impressions to achieve the desired gross rating points for the online ad campaign based on the targeting parameters and the polarization probabilities for the known polarized viewers.

\* \* \* \* \*